(12) United States Patent
Yamamoto (10) Patent No.: US 9,191,854 B2
(45) Date of Patent: Nov. 17, 2015

(54) RADIO COMMUNICATION DEVICE, RADIO COMMUNICATION SYSTEM, CONGESTION CONTROL METHOD, AND RECORD MEDIUM

(75) Inventor: Takeshi Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 81 days.

(21) Appl. No.: 14/004,975

(22) PCT Filed: Mar. 13, 2012

(86) PCT No.: PCT/JP2012/056402
§ 371 (c)(1),
(2), (4) Date: Sep. 13, 2013

(87) PCT Pub. No.: WO2012/124685
PCT Pub. Date: Sep. 20, 2012

(65) Prior Publication Data
US 2014/0004894 A1    Jan. 2, 2014

(30) Foreign Application Priority Data

Mar. 14, 2011   (JP) ................................ 2011-055032

(51) Int. Cl.
*G08G 1/123*     (2006.01)
*H04W 28/02*     (2009.01)
(Continued)

(52) U.S. Cl.
CPC ........... *H04W 28/0226* (2013.01); *G08G 1/093* (2013.01); *H04W 4/046* (2013.01);
(Continued)

(58) Field of Classification Search
USPC ............... 455/456.1, 404.1, 569.2, 575.9, 99, 455/152.1, 557; 340/438, 425.5, 426.1, 340/426.2, 426.18, 426.19, 426.21, 991, 340/993, 575.4; 348/148; 701/1, 213, 36, 701/200; 342/257.21, 457
See application file for complete search history.

(56) References Cited

U.S. PATENT DOCUMENTS

| 5,612,882 A | * | 3/1997 | LeFebvre et al. ............. 701/423 |
| 6,188,778 B1 | * | 2/2001 | Higashikubo et al. ........ 382/104 |

(Continued)

FOREIGN PATENT DOCUMENTS

| EP | 1883191 A2 | 1/2008 |
| EP | 2249611 A1 | 11/2010 |

(Continued)

OTHER PUBLICATIONS

International Search Report of PCT/JP2012/056402 dated Apr. 17, 2012.

(Continued)

*Primary Examiner* — Dominic E Rego
(74) *Attorney, Agent, or Firm* — Sughrue Mion, PLLC (57) ABSTRACT

A radio communication device that communicates with other radio communication devices that become communication partners includes first detection means that detects moving states of said other radio communication devices; second detection means that detects a moving state of its own device; third detection means that detects a congestion level of communication between said other radio communication devices or a congestion level of communication between said other radio communication devices and said own device; transmission means that transmits a radio signal from said own device to said other communication devices; and control means that controls said transmission means to transmit the radio signal based on the moving states of said other radio communication devices, the moving state of said own device, and said congestion level.

15 Claims, 6 Drawing Sheets

(51) Int. Cl.
*H04W 52/28* (2009.01)
*H04W 4/04* (2009.01)
*G08G 1/09* (2006.01)
*H04W 52/34* (2009.01)
*G08G 1/16* (2006.01)
*H04W 52/38* (2009.01)

(52) U.S. Cl.
CPC .......... *H04W52/282* (2013.01); *H04W 52/283* (2013.01); *H04W 52/343* (2013.01); *G08G 1/163* (2013.01); *H04W 52/383* (2013.01)

(56) References Cited

U.S. PATENT DOCUMENTS

| | | | |
|---|---|---|---|
| 2005/0030202 A1* | 2/2005 | Tsuboi | 340/901 |
| 2008/0029318 A1* | 2/2008 | Proietty et al. | 180/65.2 |
| 2009/0099910 A1* | 4/2009 | Merkin et al. | 705/14 |
| 2009/0212934 A1* | 8/2009 | Shiraki | 340/466 |
| 2010/0151838 A1 | 6/2010 | Wormald et al. | |
| 2011/0246052 A1* | 10/2011 | Zaitsu | 701/118 |

FOREIGN PATENT DOCUMENTS

| | | |
|---|---|---|
| JP | 200539665 A | 2/2005 |
| JP | 2006-025028 A | 1/2006 |
| JP | 2008-244960 A | 10/2008 |
| WO | 2008/099716 A1 | 8/2008 |

OTHER PUBLICATIONS

Communication dated Nov. 10, 2014 from the European Office in counterpart Application No. 12757659.3.
Communication dated May 12, 2015, issued by the Japanese Patent Office in counterpart Application No. 2013-504735.

\* cited by examiner

— 301 Neighbor vehicle information

| ID | Position information | Moving direction information | Moving speed information | Transmission power setup value | Reception power measurement value | Reception time information |
|---|---|---|---|---|---|---|
| 301a | 301b | 301c | 301d | 301e | 301f | 301g |
| ... | ... | ... | ... | ... | ... | ... |

RADIO COMMUNICATION DEVICE, RADIO COMMUNICATION SYSTEM, CONGESTION CONTROL METHOD, AND RECORD MEDIUM

CROSS REFERENCE TO RELATED APPLICATIONS

This is a National Stage of International Application No. PCT/JP2012/056402 filed Mar. 13, 2012, claiming priority based on Japanese Patent Application No. 2011-055032 filed Mar. 14, 2011, the contents of all of which are incorporated herein by reference in their entirety.

TECHNICAL FIELD

The present invention relates to a radio communication device, a radio communication system, a congestion control method, and a record medium.

BACKGROUND ART

Inter vehicle communication systems that communicate with each vehicle are known. In an inter vehicle communication system, a radio communication device mounted on a vehicle exchanges information (current position that is information about running) with radio communication devices respectively mounted on other vehicles (communication partners).

In a radio communication system where radio communication devices directly communicate with each other, not through a base station, such as an inter vehicle communication system, as the radio communication device moves, its communication state changes over time. For example, a communication state, in which there are no communication partners in the communication area its own radio communication device, might change to another communication state in which there are a few communication partners in the communication area its own radio communication device, and then to another communication state in which there are many communication partners in the communication area its own radio communication device.

If there are a large number of communication partners, namely a large number of radio communication devices, in the communication area its own radio communication device, communication of radio communication devices might congest and thereby the throughput might become lower.

Patent Literature 1 describes a radio communication device that can handle this problem. The radio communication device described in Patent Literature 1 controls the transmission power based on the transmission loss of a signal received from the communication partner so as to adjust the size of the communication area. The radio communication device described in Patent Literature 1 adjusts the size of the communication area so as to limit the number of radio communication devices that become communication partners. As a result, while the radio communication device described in Patent Literature 1 maintains a radio link with neighbor radio communication devices, this device can alleviate congestion and the decrease of throughput.

RELATED ART LITERATURE

Patent Literature

Patent Literature 1: JP2008-244960A, Publication

SUMMARY OF THE INVENTION

Problem to Be Solved By the Invention

The radio communication device described in Patent Literature 1 controls transmission power and also congestion without taking into consideration the running states of individual vehicles. Thus, the radio communication device described in Patent Literature 1 cannot control congestion based on the running states of the individual vehicles.

Figure 1:
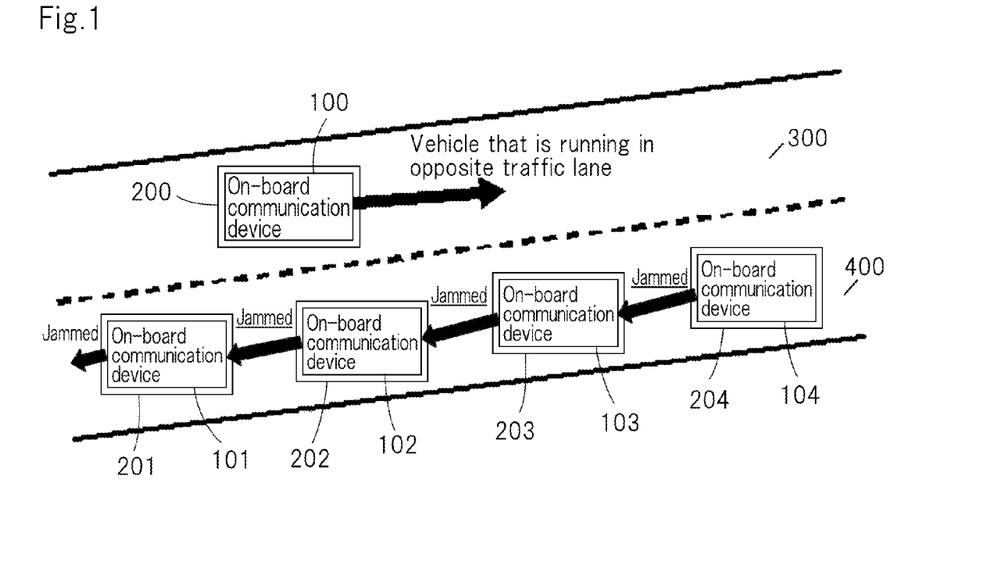
FIG. 1 is a schematic diagram showing an example of the running states of individual vehicles.

FIG. 1 is a schematic diagram showing that vehicle 200 having on-board communication device 100 that is a radio communication device is running in low traffic lane 300, vehicles 201 to 204 respectively having on-board communication devices 101 to 104 are running in jammed traffic lane 400.

In the state shown in FIG. 1, it is preferable that on-board communication device 100 in traffic lane 300 does not suppress the congestion (for example, not to decease the transmission power) if possible so as to ensure communication with other on-board communication devices (not shown) on traffic lane 300. In contrast, since on-board communication devices 101 to 104 are closer to each other on traffic lane 400, it is preferable that they suppress the congestion.

Figure 2:
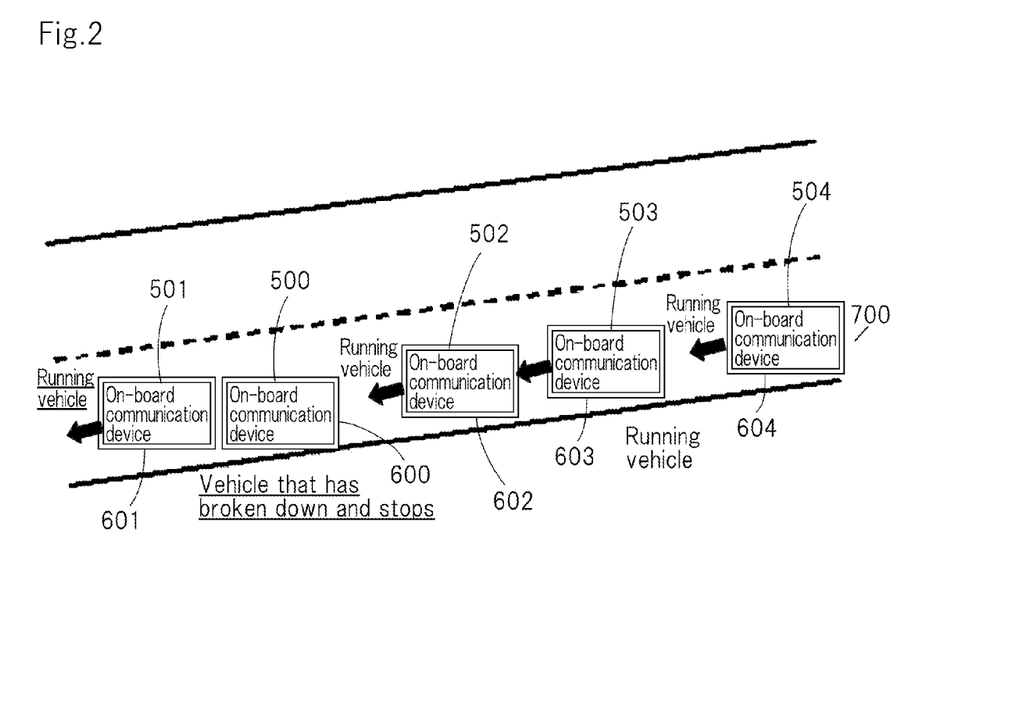
FIG. 2 is a schematic diagram showing another example of the running states of individual vehicles.

FIG. 2 is a schematic diagram showing that vehicle 600 having on-board communication device 500 has broken down and stops in traffic lane 700 and that vehicles 601 to 604 respectively having on-board communication devices 501 to 504 are running in traffic lane 700.

In the state shown in FIG. 2, it is preferable that on-board communication device 500 does not to suppress the congestion if possible so as to prevent a collision from occurring. In contrast, since on-board communication devices 501 to 504 are closer to each other on traffic lane 700, it is preferable that they suppress the congestion.

As shown in FIG. 1 and FIG. 2, it would be desirable to control the congestion in consideration of the running states of individual vehicles, namely the moving states of individual radio communication devices.

An object of the present invention is to provide radio communication devices, radio communication systems, congestion control methods, and record mediums that can solve the foregoing problem.

Means that Solved the Problem

A radio communication device according to the present invention is a radio communication device that communicates with other radio communication devices that become communication partners, including: first detection means that detects moving states of said other radio communication devices; second detection means that detects a moving state of its own device; third detection means that detects a congestion level of communication between said other radio communication devices or a congestion level of communication between said other radio communication devices and said own device; transmission means that transmits a radio signal from said own device to said other communication devices; and control means that controls said transmission means to transmit the radio signal based on the moving states of said other radio communication devices, the moving state of said own device, and said congestion level.

A radio communication system according to the present invention is a radio communication system, including: a plurality of the foregoing radio communication devices, wherein said plurality of radio communication devices communicate with each other.

A congestion control method according to the present invention is a congestion control method for a radio communication device that communicates with other radio communication devices that become communication partners, including: detecting moving states of said other radio communication devices; detecting a moving state of its own device; detecting a congestion level of communication between said other radio communication devices or a congestion level of communication between said other radio communication devices and said own device; transmitting a radio signal from said own device to said other communication devices; and controlling transmission of the radio signal based on the moving states of said other radio communication devices, the moving state of said own device, and said congestion level.

A record medium according to the present invention is a computer readable record medium on which a program that causes a computer to execute procedures is recorded, the procedures including: a first detection procedure that detects moving states of said other radio communication devices that become communication partners; a second detection procedure that detects a moving state of said computer; a third detection procedure that detects a congestion level of communication between said other radio communication devices or a congestion level of communication between said other radio communication devices and said computer; a transmission procedure that transmits a radio signal from said computer to said other communication devices; and a control procedure that controls transmission of said radio signal based on the moving states of said other radio communication devices, the moving state of said computer, and said congestion level.

Effect of the Invention

According to the present invention, the congestion can be controlled by taking into consideration the moving states of individual radio communication devices.

MODES THAT CARRY OUT THE INVENTION

Next, with reference to the accompanying drawings, exemplary embodiments of the present invention will be described.

First Exemplary Embodiment

Figure 3:
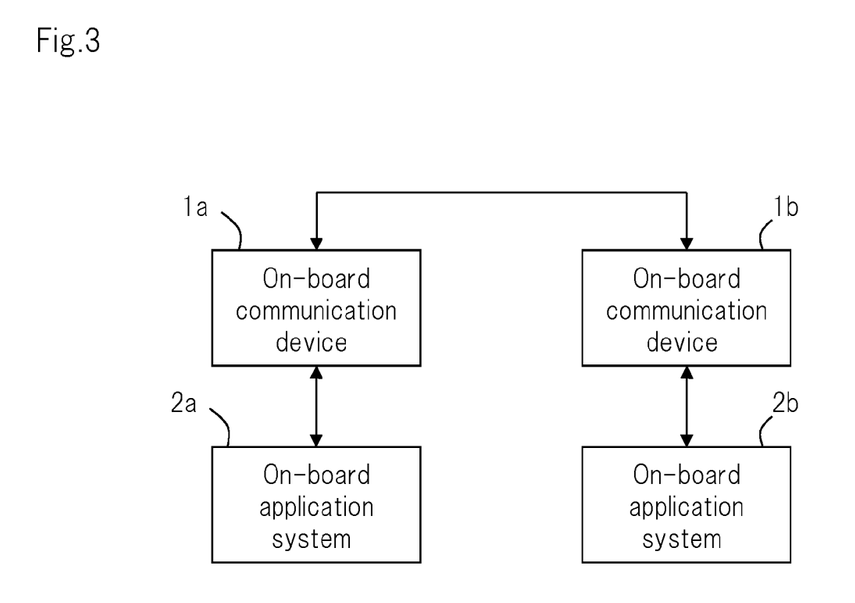
FIG. 3 is a block diagram showing an inter vehicle communication system according to a first exemplary embodiment of the present invention.

FIG. 3 is a block diagram showing an inter vehicle communication system that is a radio communication system according to a first exemplary embodiment of the present invention.

In FIG. 3, the inter vehicle communication system includes a plurality of on-board communication devices 1 (on-board communication devices 1a and 1b). Although FIG. 3 shows only two on-board communication devices 1, the number of on-board communication devices 1 is not limited to two, but may be greater than two.

On-board communication devices 1a and 1b may be generally referred to as radio communication devices. On-board communication devices 1a and 1b mutually and directly communicate with each other.

On-board communication device 1a is connected to on-board application system 2a. On-board communication device 1b is connected to on-board application system 2b.

On-board application systems 2a and 2b are, for example, known car navigation systems or known safe driving support systems. On-board application systems 2a and 2b are provided with a GPS (Global Positioning System) and various types of on-board sensors.

Figure 4:
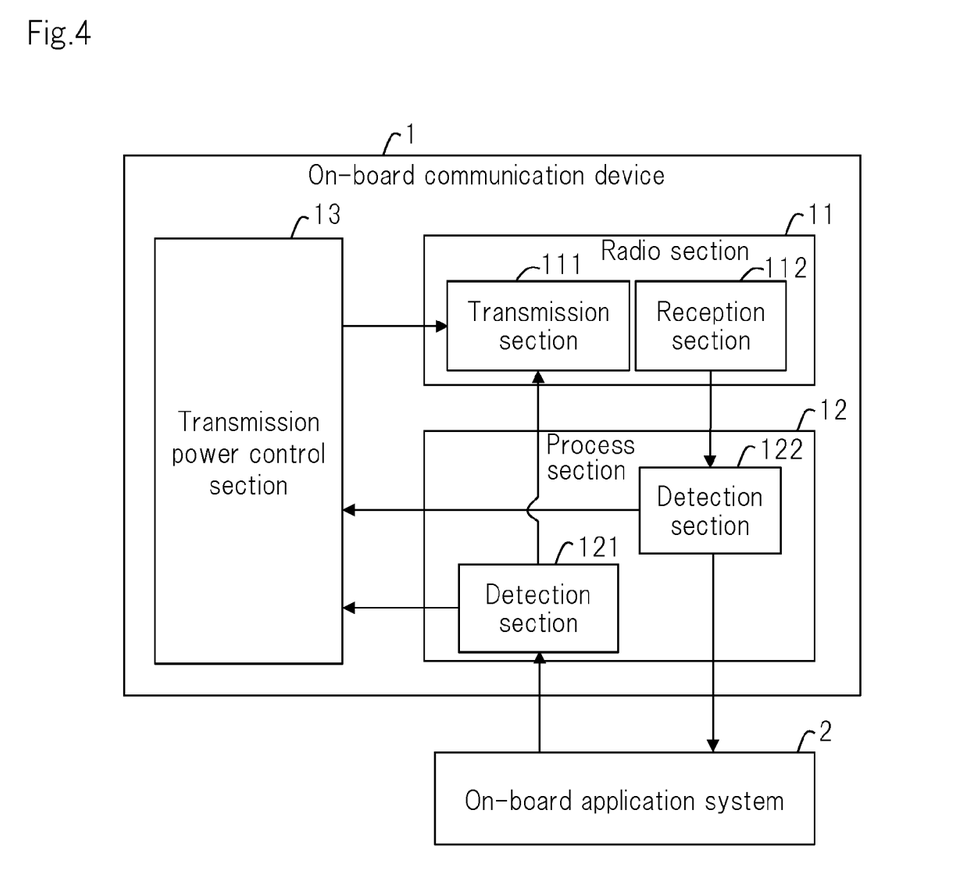
FIG. 4 is a block diagram showing on-board communication device 1.

FIG. 4 is a block diagram showing an on-board communication device 1 that is used as each of on-board communication devices 1a and 1b. In FIG. 4, on-board communication device 1 includes radio section 11, process section 12, and transmission power control section 13.

Radio section 11 transmits and receives radio signals. Radio section 11 includes transmission section 111 and reception section 112.

Transmission section 111 can be generally referred to as transmission means.

Transmission section 111 modulates transmission data that are transmitted to on-board communication devices respectively mounted on neighbor vehicles (hereinafter, these communication devices are simply referred to as "other on-board communication devices"). Transmission section 111 transmits modulated transmission data as a radio signal to other on-board communication devices.

Transmission data include identification information that serves to identify the own device (on-board communication device 1) (hereinafter, this identification information is referred to as "ID"), position information that represents the position of its own device, moving direction information that represents the moving direction of its own device, moving speed information that represents the moving speed of its own device, and transmission power setup value that represents the transmission power of its own device.

Reception section 112 can be generally referred to as first detection means.

Reception section 112 receives radio signals transmitted from other on-board communication devices. When reception section 112 receives a radio signal, reception section 112 measures the reception power of the radio signal, acquires the reception time, demodulates the radio signal, and generates reception data.

The reception data include IDs of the other on-board communication devices, position information of the other on-board communication devices, moving direction information of the other on-board communication devices, moving speed information of the other on-board communication devices, and transmission power setup values of the other on-board communication devices. Thus, reception section 112 generates the reception data so as to detect the moving states of the other on-board communication devices (moving directions or moving speeds).

Reception section 112 correlates the reception data, the measured values of the reception powers, and the reception time information that represents the reception times so as to generate neighbor vehicle information.

Figure 5:
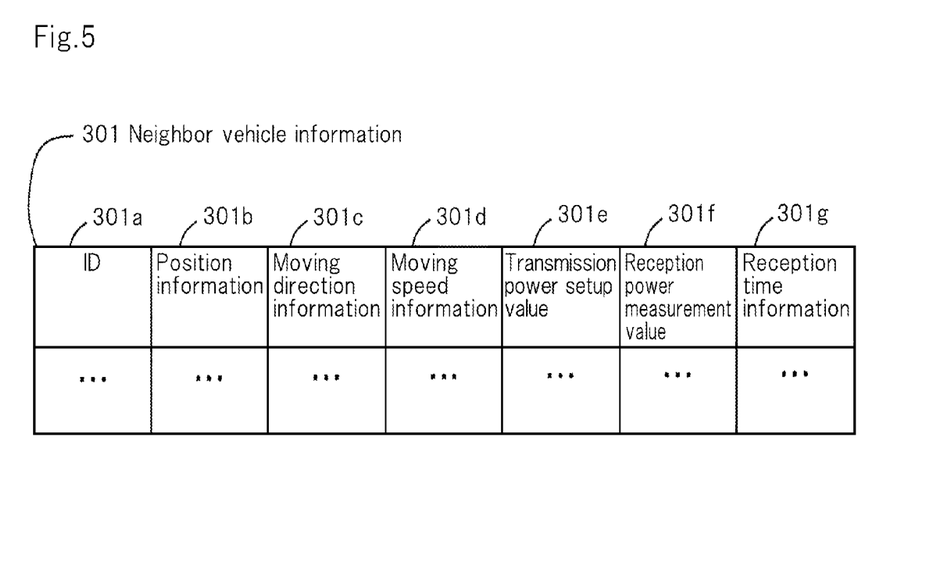
FIG. 5 is a schematic diagram showing neighbor vehicle information.

FIG. 5 is a schematic diagram showing neighbor vehicle information.

In FIG. 5, neighbor vehicle information 301 includes ID 301a, position information 301b, moving direction information 301c, moving speed information 301d, transmission power setup value 301e, reception power measurement value 301f, and reception time information 301g.

Reception section 112 outputs neighbor vehicle information 301 to process section 12.

Process section 12 receives neighbor vehicle information 301 from radio section 11. In addition, process section 12 acquires the position of the vehicle having its own device, namely the position information that represents the position of its own device, from on-board application system 2 at intervals of a predetermined time period (hereinafter referred to as "predetermined time interval").

Process section 12 includes detection sections 121 and 122.

Detection section 121 can be generally referred to as second detection means. Detection section 121 detects the moving state of its own device. According to this exemplary embodiment, detection section 121 detects the moving direction and moving speed of its own device as the moving state of its own device.

Detection section 121 detects the moving direction of its own device based on the positions represented by the position information received from on-board application system 2. For example, whenever detection section 121 acquires position information, detection section 121 stores it and detects the direction from the position represented by the former position information to the position represented by the latest position information as the moving direction of its own device. If the former position information is not present, detection section 121 does not detect the moving direction of its own device.

In addition, detection section 121 detects the moving speed of its own device based on the position represented by the position information received from on-board application system 2 and time intervals at which the position information is acquired (predetermined time intervals). For example, whenever detection section 121 acquires the position information, detection section 121 obtains the distance from the position represented by the former position information to the position represented by the latest position information, divides the distance by the predetermined time intervals, and thereby detects the moving speed of its own device. If the former position information is not present, detection section 121 does not detect the moving speed of its own device.

Detection section 121 outputs the moving direction and moving speed of its own device to transmission power control section 13 together with the ID of its own device stored in detection section 121.

In addition, detection section 121 outputs communication data that contain the position information received from on-board application system 2, the moving direction information that represents the moving direction of its own device, the moving speed information that represents the moving speed of its own device, and the ID of its own device to transmission section 111.

When transmission power control section 13 sets up the transmission power, if transmission power control section 13 does not use the moving direction, detection section 121 may not detect the moving direction of its own device. In this case, the communication data and neighbor vehicle information 301 do not include the moving direction information.

When transmission power control section 13 sets up the transmission power, if transmission power control section 13 does not use the moving speed, detection section 121 may not detect the moving speed of its own device. In this case, the communication data and neighbor vehicle information 301 do not contain the moving speed information.

Detection section 122 can be generally referred to as third detection means.

Detection section 122 receives neighbor vehicle information 301 from reception section 112. Detection section 122 outputs neighbor vehicle information 301 to transmission power control section 13 and on-board application system 2.

In addition, detection section 122 detects the congestion level that is the congestion level of communication between the other on-board communication devices and the congestion level of communication between the other on-board communication devices and its own device. In this case, detection section 122 detects the congestion level of radio channels on which its own device and the other on-board communication devices communicate with each other or the number or density of other on-board communication devices.

For example, detection section 122 detects the congestion level that is the "congestion level of radio channels" that represents the use of a plurality of radio channels in the radio communication system (inter vehicle communication system) and that is detected using a known carrier sense function or the like or the "congestion level of on-board communication devices" that represents the number or density of on-board communication devices with which its own device can communicate and that is obtained from each of neighbor vehicles.

Detection section 122 outputs the congestion level to transmission power control section 13.

Transmission power control section 13 can be generally referred to as control means.

Transmission power control section 13 stores neighbor vehicle information 301. If transmission power control section 13 newly receives neighbor vehicle information 301 having the same ID (referred to latest neighbor vehicle information 301) as neighbor vehicle information 301 that has been stored in transmission power control section 13 (referred to as former neighbor vehicle information 301), transmission power control section 13 updates former neighbor vehicle information 301 with latest neighbor vehicle information 301. Transmission power control section 13 may delete neighbor vehicle information 301 that has not been updated for a predetermined time period.

Transmission power control section 13 controls transmission section 111 to transmit a radio signal based on the moving states of the other on-board communication devices represented by neighbor vehicle information 301, the moving state of its own device detected by detection section 121, and the congestion level of communication detected by detection section 122.

Transmission power control section 13 controls the transmission power of the radio signal based on the moving states of the other on-board communication devices, the moving state of its own device, and the congestion level of communication.

According to this exemplary embodiment, transmission power control section 13 determines whether or not the ratio of the number of on-board communication devices that move in the same direction or in nearly the same direction as its own device to the number of other on-board communication devices is equal to or greater than a threshold (hereinafter, this ratio is referred to as "first ratio"). The threshold is, for example, 80%. It should be noted that the threshold may be adequately changed to other than 80%, for example, 50% or greater.

The moving direction that is the same or nearly the same as the moving direction of its own device is a moving direction in which the deviation angle to the moving direction of its own device is n (where n is any number that is equal to or greater than 0 and that is less than 45). n is a number used to detect the on-board communication devices that move on that same land as its own device of other on-board communication devices. n may be adequately selected from a value that is equal to or greater than 0 and that is less than 45.

If the first ratio is equal to or greater than the threshold, when the congestion level exceeds a reference value, transmission power control section 13 decreases the transmission power setup value of the radio signal by equal to or greater than a first predetermined value. In contrast, if the first ratio is less than the threshold, when the congestion level exceeds the reference value, transmission power control section 13 decreases the transmission power setup value of the radio signal by a value that is equal to or greater than 0 and that is less than the first predetermined value. The threshold, the reference value, and the first predetermined value can be adequately changed and are stored in transmission power control section 13.

Transmission power control section 13 may control the transmission power of the radio signal based on the moving speeds of the other on-board communication devices, the moving speed of its own device, and the congestion level of communication.

In this case, transmission power control section 13 determines whether or not the ratio of the number of other on-board communication devices that move at a moving speed that differs from its own device in a predetermined range to the number of other on-board communication devices is equal to or greater than the threshold (hereinafter, this ratio is referred to as "second ratio"). The predetermined range is for example from 0 km/h to 50 km/h. It should be noted that the predetermined range may be adequately changed to other than 0 km/h to 50 km/h.

If the second ratio is equal to or greater than the threshold, when the congestion level exceeds a reference value, transmission power control section 13 decreases the transmission power setup value of the radio signal by equal to or greater than a first predetermined value. In contrast, if the second ratio is less than the threshold, when the congestion level exceeds the reference value, transmission power control section 13 decreases the transmission power setup value of the radio signal by a value that is equal to or greater than 0 and that is less than the first predetermined value. In this case, likewise, the threshold, the reference value, and the first predetermined value can be adequately changed and are stored in transmission power control section 13.

Transmission power control section 13 outputs the transmission power setup value to transmission section 111.

Transmission section 111 adds the transmission power setup value to the communication data received from detection section 121, obtains transmission data, modulates the transmission data, and transmits the modulated transmission data as a radio signal having the transmission power represented by the transmission power setup value to the other on-board communication devices.

Next, the operation of this exemplary embodiment will be described.

When reception section 112 receives radio signals from the other on-board communication devices, reception section 112 measures the reception powers of the radio signals, acquires the reception times, demodulates the radio signals, and generates reception data.

Reception section 112 correlates the reception data, the measured values of the reception powers, and the reception time information that represents the reception times so as to generate neighbor vehicle information 301. Thereafter, reception section 112 outputs neighbor vehicle information 301 to process section 12.

In process section 12, detection section 121 detects the moving direction of its own device based on the positions represented by the position information received from on-board application system 2. In addition, detection section 121 detects the moving speed of its own device based on the positions represented by the position information received from on-board application system 2 and time intervals at which the position information is acquired (predetermined time intervals).

Detection section 121 outputs the moving direction information and moving speed information of its own device to transmission power control section 13 together with the ID of its own device stored in detection section 121. In addition, detection section 121 outputs communication data that include the position information received from on-board application system 2, the moving direction information, the moving speed information of its own device, and the ID of its own device to transmission section 111.

When detection section 122 receives neighbor vehicle information 301 from reception section 112, detection section 122 outputs neighbor vehicle information 301 to transmission power control section 13 and on-board application system 2.

In addition, detection section 122 detects the congestion level of communication between other on-board communication devices and its own device and outputs the congestion level to transmission power control section 13.

Transmission power control section 13 controls the transmission power setup value of the radio signal based on the moving states (moving directions or moving speeds) of the other on-board communication devices represented by neighbor vehicle information 301, the moving state of its own device detected by detection section 121, and the congestion level of communication detected by detection section 122.

If the first ratio is equal to or greater than the threshold, when the congestion level exceeds a reference value, transmission power control section 13 decreases the transmission power setup value of the radio signal by a value that is equal to or greater than a first predetermined value. In contrast, if the first ratio is less than the threshold, when the congestion level exceeds the reference value, transmission power control section 13 decreases the transmission power setup value of the radio signal by a value that is equal to or greater than 0 and that is less than the first predetermined value.

When on-board communication device 1 is turned on, transmission power control section 13 sets a default value to the transmission power setup value.

Transmission section 111 adds the transmission power setup value to the communication data received from detection section 121, obtains transmission data, modulates the transmission data, and transmits the modulated transmission data as a radio signal having the transmission power represented by the transmission power setup value to the other on-board communication devices.

Next, an example of transmission power control will be described.

In the inter vehicle communication system, as shown in FIG. 1, a plurality of on-board communication devices such as on-board communication devices 100 to 104 might be closer to each other and they might transmit and receive radio signals to and from each other. In the following description, each of on-board communication devices 100 to 104 has the same structure as on-board communication device 1.

As the number of neighbor vehicles increases, the congestion level of the radio transmission path increases. Each of on-board communication devices 100 to 104 detects the congestion level of radio channels, for example, using the carrier sense technique or detects the congestion level of the radio transmission path based on information that represents the density of neighbor on-board communication devices obtained from neighbor vehicle information 301.

While on-board communication devices 101 to 104 run in the same direction, only on-board communication device 100 runs in the opposite direction.

In this case, even if the congestion level of the radio transmission path is high, the traffic of traffic lane 300, where on-board communication device 100 is moving, is low. Thus, when on-board communication device 100 communicates with other on-board communication devices (not shown) that are moving in the same direction, it is preferable that on-board communication device 100 not decrease the transmission power, but increase the communication distance as much as possible.

Thus, according to this exemplary embodiment, even if on-board communication devices 101 to 104 decrease the transmission power as the congestion level of the radio communication path increases, on-board communication device 100 does not decrease the transmission power. Alternatively, on-board communication device 100 decreases the transmission power in such a manner that the amount of decrease of the transmission power of on-board communication device 100 is less than that of each of on-board communication devices 101 to 104.

In addition, as shown in FIG. 2, a plurality of on-board communication devices such as on-board communication devices 500 to 504 might be closer to each other and they might transmit and receive radio signals to and from each other. In the following description, each of on-board communication devices 500 to 504 has the same structure as on-board communication device 1.

While on-board communication devices 501 to 504 are moving nearly at the same moving speed, only on-board communication device 500 stops.

In this case, the speed difference between on-board communication device 500 and each of the other on-board communication devices is large and their moving states differ. Thus, even if the congestion level of the radio transmission path is high, it is preferable that on-board communication device 500 not decrease the transmission power, but increase the communication distance as much as possible so as to prevent a collision or the like from occurring.

Thus, according to this exemplary embodiment, even if on-board communication devices 501 to 504 decrease the transmission power as the congestion level of the radio communication path increases, on-board communication device 500 does not decrease the transmission power. Alternatively, on-board communication device 500 decreases the transmission power in such a manner that the amount of decrease of the transmission power of on-board communication device 500 is lower than that of each of on-board communication devices 501 to 504.

Next, the effects of this exemplary embodiment will be described.

According to this exemplary embodiment, reception section 112 detects the moving states of the other on-board communication devices. Detection section 121 detects the moving state of its own device. Detection section 122 detects the congestion level of communication between other on-board communication devices and the congestion level of communication between other on-board communication devices and the own device. Transmission section 111 transmits a radio signal from its own device to other on-board communication devices. Transmission power control section 13 controls transmission section 111 to transmit the radio signal based on the moving states of other on-board communication devices, the moving state of its own device, and the congestion level.

Thus, the congestion level of communication can be controlled by taking into consideration the moving states of the individual on-board communication devices.

According to this exemplary embodiment, transmission power control section 13 determines whether or not the first ratio (the ratio of the number of other on-board communication devices that move in the same direction or in nearly the same direction as the own device to the number of other on-board communication devices) is equal to or greater than the threshold. If the first ratio is equal to or greater than the threshold, when the congestion level exceeds a reference value, transmission power control section 13 decreases the transmission power setup value of the radio signal by the value that is equal to or greater than the first predetermined value. In contrast, if the first ratio is less than the threshold, when the congestion level exceeds the reference value, transmission power control section 13 decreases the transmission power setup value of the radio signal by a value that is equal to or greater than zero and that is less than the first predetermined value.

Thus, even if a state in which the radio transmission path congestion is detected, when a small number of vehicles are smoothly running in a low traffic lane, each of on-board communication devices mounted on the vehicles does not decrease the transmission power so as to ensure a communication distance at which they can smoothly run. Alternatively, the amount of decrease of the transmission power of each of these on-board communication devices that move on the low traffic lane can be lower than that of the on-board communication devices that move in the jammed traffic lane.

If the second ratio (the ratio of the number of other on-board communication devices that move at a moving speed that differs from the own device in a predetermined range to the number of other on-board communication devices) is equal to or greater than the threshold, when the congestion level exceeds a reference value, transmission power control section 13 decreases the transmission power setup value of the radio signal by the value that is equal to or greater than the first predetermined value. In contrast, if the second ratio is less than the threshold, when the congestion level exceeds the reference value, transmission power control section 13 decreases the transmission power setup value of the radio signal by a value that is equal to or greater than 0 and that is less than the first predetermined value. As a result, the following effects can be realized.

An on-board communication device mounted on a vehicle that is running in a different running state from other vehicles or stops increases the priority of information of its own device over information received from other on-board communication devices based on information of the moving speeds. Thus, even if the congestion level of the radio communication path increases, the on-board communication device does not decrease the transmission power. Alternatively, the amount of decrease of the transmission power of the on-board communication device can be lower than that of the other on-board communication devices.

As described above, the transmission power can be adequately controlled corresponding to the running states of vehicles and neighboring traffic states based on information of the moving speeds and moving directions of on-board communication devices so as to decrease the congestion level of the radio transmission path.

On-board communication device 1 may be realized by a computer. In this case, the computer reads a program from a computer readable record medium such as a CD-ROM (Compact Disk Read Only Memory) and then executes the program such that the computer operates as radio section 11, process section 12, and transmission power control section 13. The record medium is not limited to a CD-ROM, but can be changed to any appropriate medium.

Second Exemplary Embodiment

Figure 6:
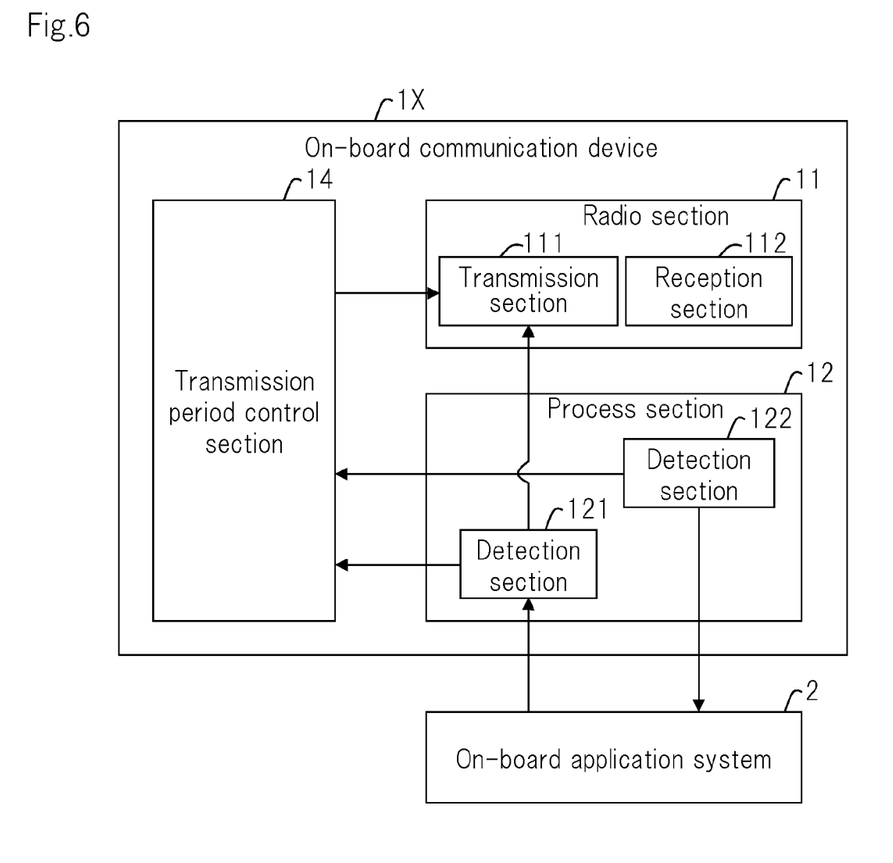
FIG. 6 is a block diagram showing on-board communication section 1X.

FIG. 6 is a block diagram showing on-board communication device 1X used for an inter vehicle communication system that is a radio communication system according to a second exemplary embodiment of the present invention.

On-board communication device 1X shown in FIG. 6 is different from on-board communication device 1 shown in FIG. 4 in that the former has transmission period control section 14 instead of transmission power control section 13. Next, differences between on-board communication device 1X and on-board communication device 1 will be mainly described.

In FIG. 6, transmission period control section 14 can be generally referred to as control means.

Transmission period control section 14 receives neighbor vehicle information 301 from detection section 122 and stores neighbor vehicle information 301. According to this exemplary embodiment, neighbor vehicle information 301 may not include transmission power setup value 301*e*. If transmission period control section 14 newly receives neighbor vehicle information 301 having the same ID (referred to as latest neighbor vehicle information 301) as neighbor vehicle information 301 that has been stored in transmission period control section 14 (referred to as former neighbor vehicle information 301), transmission period control section 14 updates former neighbor vehicle information 301 with latest neighbor vehicle information 301. Transmission period control section 14 may delete neighbor vehicle information 301 that has not been updated for a predetermined time period.

Transmission period control section 14 controls the transmission period of the radio signal transmitted by transmission section 111 based on the moving states of the other on-board communication devices represented by neighbor vehicle information 301, the moving state of the own device detected by detection section 121, and the congestion level of communication detected by detection section 122.

According to this exemplary embodiment, like transmission power control section 13, transmission period control section 14 determines whether or not a first ratio is equal to or greater than a threshold.

If the first ratio is equal to or greater than the threshold, when the congestion level exceeds a reference value, transmission period control section 14 increases the transmission period setup value of a radio signal by a value that is equal to or greater than a second predetermined value. In contrast, if the first ratio is less than the threshold, when the congestion level exceeds the reference value, transmission period control section 14 increases the transmission period setup value by a value that is equal to or greater than 0 and that is less than the second predetermined value. The threshold, the reference value, and the second predetermined value can be adequately changed and are stored in transmission period control section 14.

Transmission period control section 14 may control the transmission period of the radio signal based on the moving speeds of the other on-board communication devices, the moving speed of the own device, and the congestion level of communication.

In this case, transmission period control section 14 determines whether or not a second ratio is equal to or greater than a threshold.

If the second ratio is equal to or greater than the threshold, when the congestion level exceeds the reference value, transmission period control section 14 increases the transmission power setup value of the radio signal by a value that is equal to or greater than the second predetermined value. In contrast, if the second ratio is less than the threshold, when the congestion level exceeds the reference value, transmission period control section 14 increases the transmission period setup value by a value that is equal to or greater than 0 and that is less than the second predetermined value. In this case, the threshold, the reference value, and the second predetermined value can be adequately changed and are stored in transmission period control section 14.

Transmission period control section 14 outputs the transmission period setup value to transmission section 111.

When on-board communication device 1X is turned on, transmission period control section 14 sets a default value to the transmission period setup value.

Transmission section 111 modulates communication data received from detection section 121, obtains the modulated transmission data, and transmits the modulated transmission data as a radio signal having the transmission period represented by the transmission period setup value to the other on-board communication devices.

According to this exemplary embodiment, transmission period control section 14 controls the transmission period of the radio signal based on the moving states (moving directions or moving speeds) of the other on-board communication devices, the moving state of its own device, and the congestion level of communication. Thus, the second exemplary embodiment can achieve the same congestion control as the first embodiment.

On-board communication device 1X may be realized by a computer. In this case, the computer reads a program from a computer readable record medium and then executes the program such that the computer operates as radio section 11, process section 12, and transmission period control section 14.

Third Exemplary Embodiment

Figure 7:
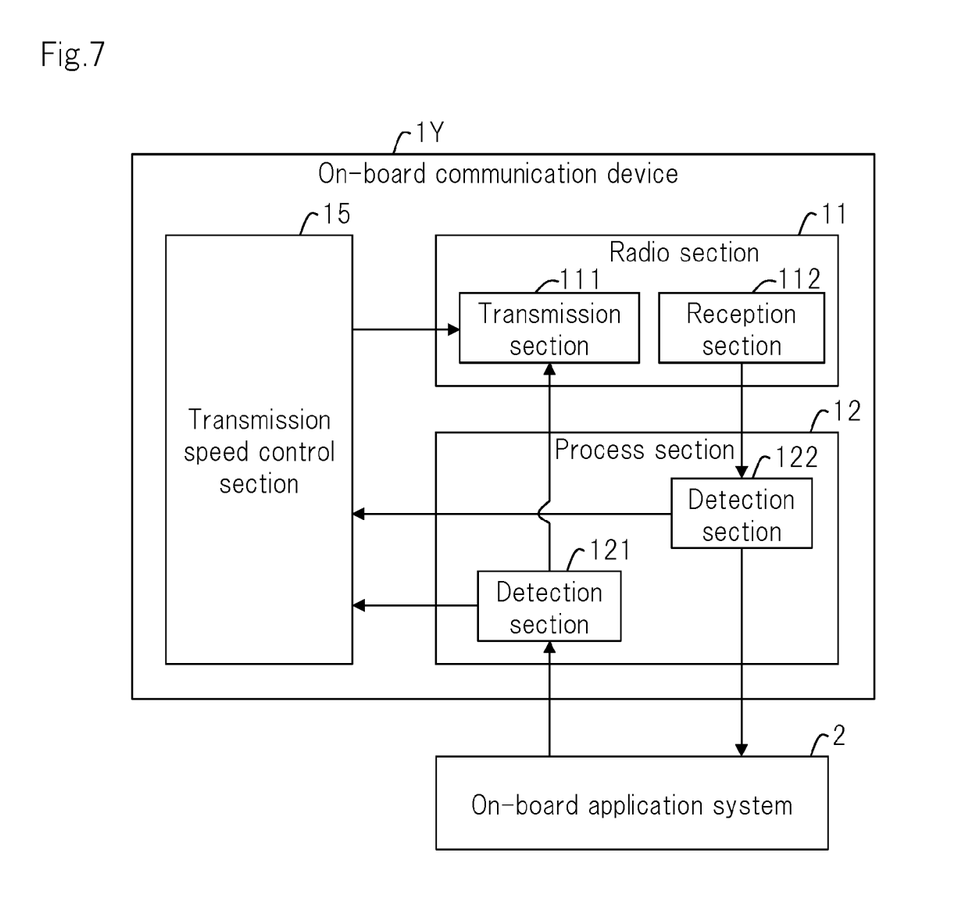
FIG. 7 is a block diagram showing on-board communication section 1Y.

FIG. 7 is a block diagram showing on-board communication device 1Y used for an inter vehicle communication system that is a radio communication system according to a third exemplary embodiment of the present invention.

On-board communication device 1Y shown in FIG. 7 is different from on-board communication device 1 shown in FIG. 4 in that the former has transmission speed control section 15 instead of transmission power control section 13. Next, differences between on-board communication device 1Y and on-board communication device 1 will be mainly described.

In FIG. 7, transmission speed control section 15 can be generally referred to as control means.

Transmission speed control section 15 receives neighbor vehicle information 301 from detection section 122 and stores neighbor vehicle information 301. According to this exemplary embodiment, neighbor vehicle information 301 may not include transmission power setup value 301e. If transmission speed control section 15 newly receives neighbor vehicle information 301 having the same ID (referred to as latest neighbor vehicle information 301) as neighbor vehicle information 301 that has been stored in transmission speed control section 15 (referred to as former neighbor vehicle information 301), transmission speed control section 15 will update former neighbor vehicle information 301 with latest neighbor vehicle information 301. Transmission speed control section 15 may delete neighbor vehicle information 301 that has not been updated for a predetermined time period.

Transmission speed control section 15 controls the transmission speed of the radio signal transmitted by transmission section 111 based on the moving states of the other on-board communication devices represented by neighbor vehicle information 301, the moving state of the own device detected by detection section 121, and the congestion level of communication detected by detection section 122.

According to this exemplary embodiment, like transmission power control section 13, transmission speed control section 15 determines whether or not a first ratio is equal to or greater than a threshold.

If the first ratio is equal to or greater than the threshold, when the congestion level exceeds a reference value, transmission speed control section 15 increases the transmission speed setup value of a radio signal by a value that is equal to or greater than a third predetermined value. In contrast, if the first ratio is less than the threshold, when the congestion level exceeds the reference value, transmission speed control section 15 increases the transmission speed setup value by a value that is equal to or greater than 0 and that is less than the third predetermined value. The threshold, the reference value, and the third predetermined value can be adequately changed and are stored in transmission speed control section 15.

Transmission speed control section 15 may control the transmission speed of the radio signal based on the moving speeds of the other on-board communication devices, the moving speed of its own device, and the congestion level of communication.

In this case, transmission speed control section 15 determines whether or not a second ratio is equal to or greater than the threshold.

If the second ratio is equal to or greater than the threshold, when the congestion level exceeds the reference value, transmission speed control section 15 increases the transmission speed setup value of the radio signal by a value that is equal to or greater than the third predetermined value. In contrast, if the second ratio is less than the threshold, when the congestion level exceeds the reference value, transmission speed control section 15 increases the transmission speed setup value by a value that is equal to or greater than 0 and that is less than the third predetermined value. In this case, the threshold, the reference value, and the third predetermined value can be adequately changed and are stored in transmission speed control section 15.

Transmission speed control section 15 outputs the transmission speed setup value to transmission section 111.

When on-board communication device 1Y is turned on, transmission speed control section 15 sets the default value to the transmission speed setup value.

Transmission section 111 modulates communication data received from detection section 121, obtains the modulated transmission data, and transmits the modulated transmission data as a radio signal having the transmission speed represented by the transmission speed setup value to the other on-board communication devices.

According to this exemplary embodiment, transmission speed control section 15 controls the transmission speed of the radio signal based on the moving states (moving directions or moving speeds) of the other on-board communication devices, the moving state of its own device, and the congestion level of communication. Thus, the third exemplary embodiment can achieve the same congestion control as the first exemplary embodiment.

On-board communication device 1Y may be realized by a computer. In this case, the computer reads a program from a computer readable record medium and then executes the program such that the computer operates as radio section 11, process section 12, and transmission speed control section 15.

According to each of the foregoing exemplary embodiments, reception section 112 demodulates a radio signal so as to detect the moving directions of the other on-board communication devices. Alternatively, detection section 122 may detect the moving directions of the other on-board communication devices based on position information 301b of neighbor vehicle information 301 corresponding to the other on-board communication devices.

For example, when detection section 122 receives neighbor vehicle information 301, detection section 122 reads position information 301b corresponding to ID 301a included therein from neighbor vehicle information 301 stored in transmission power control section 13, transmission period control section 14, or transmission speed control section 15.

Thereafter, detection section 122 detects the direction from the position represented by position information 301b of neighbor vehicle information 301 that has been read to the position represented by position information 301b of neighbor vehicle information 301 that has been received as the moving direction of the on-board communication device identified by ID 301a of neighbor vehicle information 301 that has been received.

Thereafter, detection section 122 outputs moving direction information that represents the moving direction of the on-board communication device to transmission power control section 13, transmission period control section 14, or transmission speed control section 15. In this case, detection section 122 also operates as first detection means.

In this case, transmission data may not include moving direction information.

According to each of the foregoing exemplary embodiments, reception section 112 demodulates a radio signal so as to detect the moving speeds of other on-board communication devices. Alternatively, detection section 122 may detect the moving speeds of the other on-board communication devices based on position information 301b of neighbor vehicle information 301 corresponding to the other on-board communication devices and received time interval of position information 301b.

For example, when detection section 122 receives neighbor vehicle information 301, detection section 122 reads position information 301b corresponding to ID301a included in neighbor vehicle information 301 from neighbor vehicle information 301 stored in transmission power control section 13, transmission period control section 14, or transmission speed control section 15 (hereinafter, this position information is referred to as "former information").

Thereafter, detection section 122 calculates the distance from the position represented by position information 301b of neighbor vehicle information 301 that has been read to the position represented by position information 301b of neighbor vehicle information 301 that has been received.

Thereafter, detection section 122 calculates an elapsed time period (received time interval) from the date and time represented by reception time information 301g of the former information to the date and time represented by reception time information 301g of neighbor vehicle information 301 that has been received.

Thereafter, detection section 122 divides the calculated distance by the calculated elapsed time period so as to detect the moving speed of the on-board communication device identified by ID 301a.

Thereafter, detection section 122 outputs moving speed information that represents the moving speed of the on-board communication device to transmission power control section 13, transmission period control section 14, or transmission speed control section 15. In this case, detection section 122 also operates as first detection means.

In this case, the transmission data may not include the moving speed information.

According to each of the foregoing exemplary embodiments, detection section 122 outputs neighbor vehicle information 301 to on-board application system 2. Alternatively, detection section 122 may output only information required by on-board application system 2 of neighbor vehicle information 301 to on-board application system 2. In this case, information that is not necessary to control the congestion and that is not required by on-board application system 2 may be deleted from the transmission data.

With reference to the exemplary embodiments, the present invention has been described. However, it should be understood by those skilled in the art that the structure and details of the present invention may be changed in various manners without departing from the scope of the present invention.

The present application claims a priority based on Japanese Patent Application JP 2011-055032 filed on Mar. 14, 2011, the entire contents of which are incorporated herein by reference in its entirety.

DESCRIPTION OF REFERENCE NUMERALS 1, 1X, 1Y, 1a, 1b On-board communication devices
11 Radio section
111 Transmission section
112 Reception section
12 Process section
121, 122 Detection sections
13 Transmission power control section
14 Transmission period control section
15 Transmission speed control section
2, 2a, 2b On-board application systems

What is claimed is:

1. A radio communication device that communicates with other radio communication devices that are communication partners, comprising:

a first detection unit that detects moving states of said other radio communication devices;

a second detection unit that detects a moving state of its own device;

a third detection unit that detects a congestion level of communication between said other radio communication devices or a congestion level of communication between said other radio communication devices and said own device;

a transmission unit that transmits a radio signal from said own device to said other communication devices; and a control unit that controls said transmission unit to transmit the radio signal based on the moving states of said other radio communication devices, the moving state of said own device, and said congestion level.

2. The radio communication device as set forth in claim 1, wherein said moving state is a moving direction, wherein if a ratio of the number of other radio communication devices that move in the same or nearly the same moving direction as said own device to the number of said other radio communication devices is equal to or greater than a threshold, when said congestion level exceeds a reference value, said control unit decreases a transmission power of said radio signal by a value that is equal to or greater than a predetermined value, and wherein if said ratio is less than said threshold, when said congestion level exceeds said reference value, said control unit decreases said transmission power by a value that is equal to or greater than 0 and that is less than said predetermined value.

3. The radio communication device as set forth in claim 2, wherein said second detection unit acquires the position of said own device a plurality of times and detects the moving direction of said own device based on said plurality of positions of said own device, wherein whenever said second detection unit acquires the position of said own device, said transmission unit transmits position information that represents the position of said own device as said radio signal to said other radio communication devices, and wherein said first detection unit receives said position information from said other radio communication devices a plurality of times and detects moving directions of said other radio communication devices based on the position information received the plurality of times.

4. The radio communication device as set forth in claim 2, wherein said second detection unit acquires the position of said own device a plurality of times and detects the moving direction of said own device based on said plurality of positions of said own device, wherein said transmission unit transmits moving direction information that represents a moving direction of said own device as said radio signal to said other radio communication devices, and wherein said first detection unit receives said moving direction information from said other radio communication devices and detects moving directions of said other radio communication devices based on the moving direction information.

5. The radio communication device as set forth in claim 1, wherein said moving state is a moving direction, wherein if a ratio of the number of other radio communication devices that move in the same or nearly the same moving direction as said own device to the number of said other radio communication devices is equal to or greater than a threshold, when said congestion level exceeds a reference value, said control unit increases a transmission period of said radio signal by a value that is equal to or greater than a predetermined value, and wherein if said ratio is less than said threshold, when said congestion level exceeds said reference value, said control unit increases said transmission period by a value that is equal to or greater than 0 and that is less than said predetermined value.

6. The radio communication device as set forth in claim 1, wherein said moving state is a moving direction, wherein if a ratio of the number of other radio communication devices that move in the same or nearly the same moving direction as said own device to the number of said other radio communication devices is equal to or greater than a threshold, when said congestion level exceeds a reference value, said control unit increases a transmission speed of said radio signal by a value that is equal to or greater than a predetermined value, and wherein if said ratio is less than said threshold, when said congestion level exceeds said reference value, said control unit increases said transmission speed by a value that is equal to or greater than 0 and that is less than said predetermined value.

7. The radio communication device as set forth in claim 1, wherein said moving state is a moving speed, wherein if a ratio of the number of other radio communication devices that move at a moving speed that differs from its own device in a predetermined range to the number of said other radio communication devices is equal to or greater than a threshold, when said congestion level exceeds a reference value, said control unit decreases a transmission power of said radio signal by a value that is equal to or greater than a predetermined value, and wherein if said ratio is less than said threshold, when said congestion level exceeds said reference value, said control unit decreases said transmission power by a value that is equal to or greater than 0 and that is less than said predetermined value.

8. The radio communication device as set forth in claim 7, wherein said second detection unit acquires the position of said own device a plurality of times and detects the moving speed of said own device based on said plurality of positions of said own device and time intervals at which the positions are acquired, wherein whenever said second detection unit acquires the position of said own device, said transmission unit transmits position information that represents the position of said own device as said radio signal to said other radio communication devices, and wherein said first detection unit receives said position information from said other radio communication devices a plurality of times and detects moving speeds of said other radio communication devices based on the position information received the plurality of times and the received time intervals of the position information.

9. The radio communication device as set forth in claim 7, wherein said second detection unit acquires the position of said own device a plurality of times and detects the moving speed of said own device based on said plurality of positions of said own device and time intervals at which the positions are acquired, wherein said transmission unit transmits moving speed information that represents the moving speed of said own device as said radio signal to said other radio communication devices, and wherein said first detection unit receives said moving speed information from said other radio communication devices and detects moving speeds of said other radio communication devices based on the moving speed information.

10. The radio communication device as set forth in claim 1, wherein said moving state is a moving speed, wherein if a ratio of the number of other radio communication devices that move at a moving speed that differs from its own device in a predetermined range to the number of said other radio communication devices is equal to or greater than a threshold, when said congestion level exceeds a reference value, said control unit increases a transmission period of said radio signal by a value that is equal to or greater than a predetermined value, and wherein if said ratio is less than said threshold, when said congestion level exceeds said reference value, said control unit increases said transmission period by a value that is equal to or greater than 0 and that is less than said predetermined value.

11. The radio communication device as set forth in claim 1, wherein said moving state is a moving speed, wherein if a ratio of the number of other radio communication devices that move at a moving speed that differs from its own device in a predetermined range to the number of said other radio communication devices is equal to or greater than a threshold, when said congestion level exceeds a reference value, said control unit increases a transmission speed of said radio signal by a value that is equal to or greater than a predetermined value, and wherein if said ratio is less than said threshold, when said congestion level exceeds said reference value, said control unit increases said transmission speed by a value that is equal to or greater than 0 and that is less than said predetermined value.

12. The radio communication device as set forth in claim 1, wherein said third detection unit detects said congestion level that is the congestion level of radio channels between said other radio communication devices or the number or density of said other radio communication devices.

13. A radio communication system comprising:
a plurality of radio communication devices as set forth in claim 1,
wherein said plurality of radio communication devices communicate with each other.

14. A congestion control method for a radio communication device that communicates with other radio communication devices that are communication partners, comprising:
detecting moving states of said other radio communication devices;
detecting a moving state of its own device;
detecting a congestion level of communication between said other radio communication devices or a congestion level of communication between said other radio communication devices and said own device;
transmitting a radio signal from said own device to said other communication devices; and
controlling transmission of the radio signal based on the moving states of said other radio communication devices, the moving state of said own device, and said congestion level.

15. A non-transitory computer readable record medium on which a program that causes a computer to execute procedures is recorded, the procedures comprising:

a first detection procedure that detects moving states of said other radio communication devices that are communication partners;
a second detection procedure that detects a moving state of said computer;
a third detection procedure that detects a congestion level of communication between said other radio communication devices or a congestion level of communication between said other radio communication devices and said computer;
a transmission procedure that transmits a radio signal from said computer to said other communication devices; and
a control procedure that controls transmission of said radio signal based on the moving states of said other radio communication devices, the moving state of said computer, and said congestion level.

* * * * *